A. G. HIGGINS.
APPARATUS FOR CONSTRUCTING PLASTIC COLUMNS.
APPLICATION FILED FEB. 16, 1914.
1,156,077.
Patented Oct. 12, 1915.
2 SHEETS—SHEET 1.
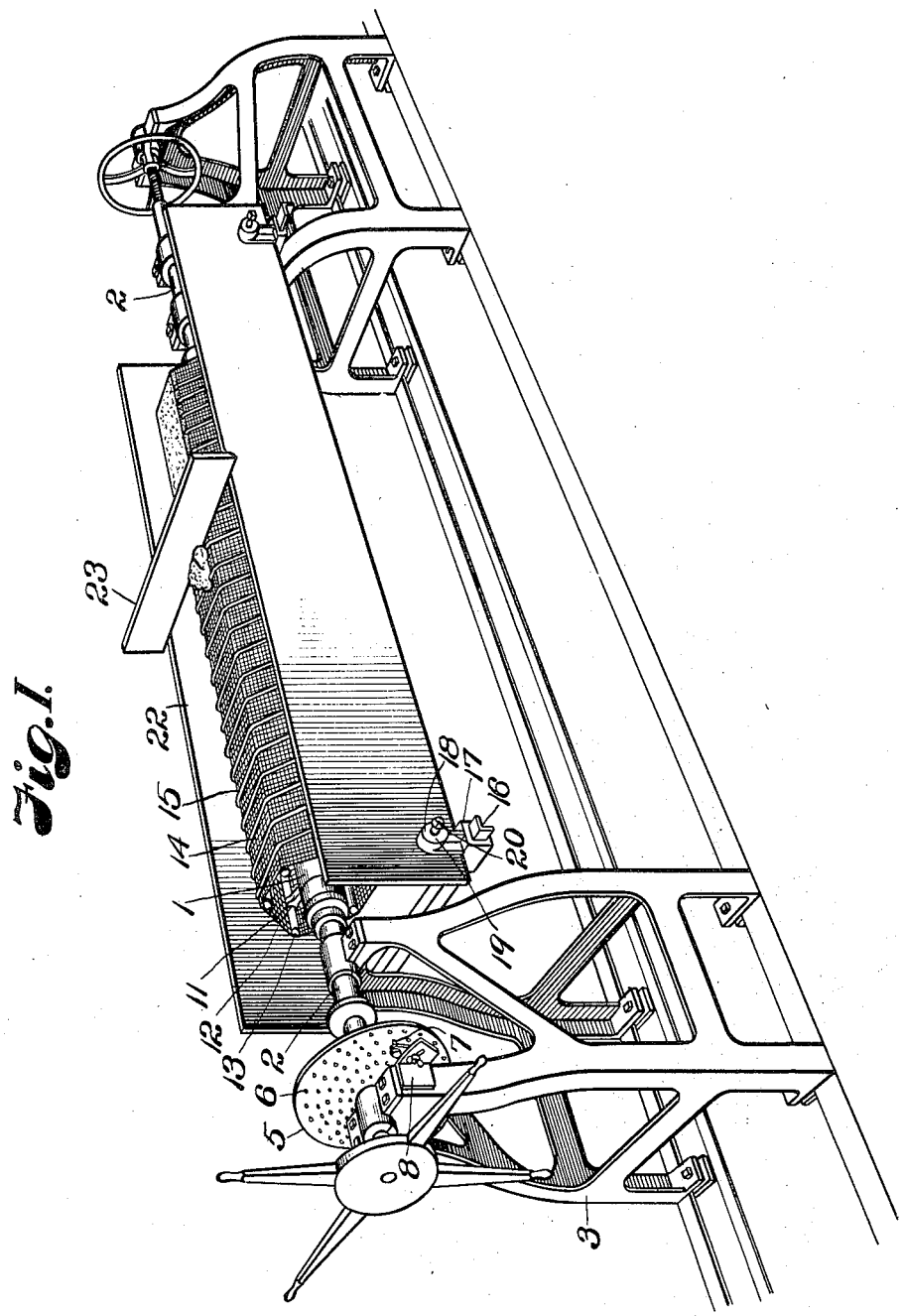
WITNESSES:
Arthur W. Caps.
Lynn A. Robinson.
INVENTOR
A. G. Higgins.
BY
Arthur C. Crown
ATTORNEY A. G. HIGGINS.
APPARATUS FOR CONSTRUCTING PLASTIC COLUMNS.
APPLICATION FILED FEB. 16, 1914.
1,156,077.
Patented Oct. 12, 1915.
2 SHEETS—SHEET 2.
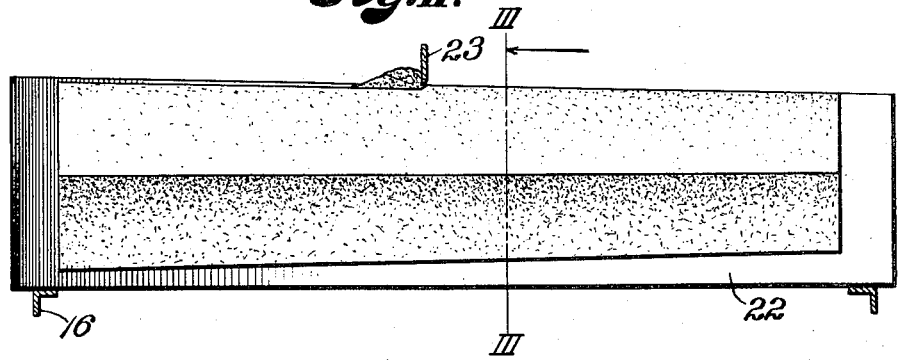
Fig. II.
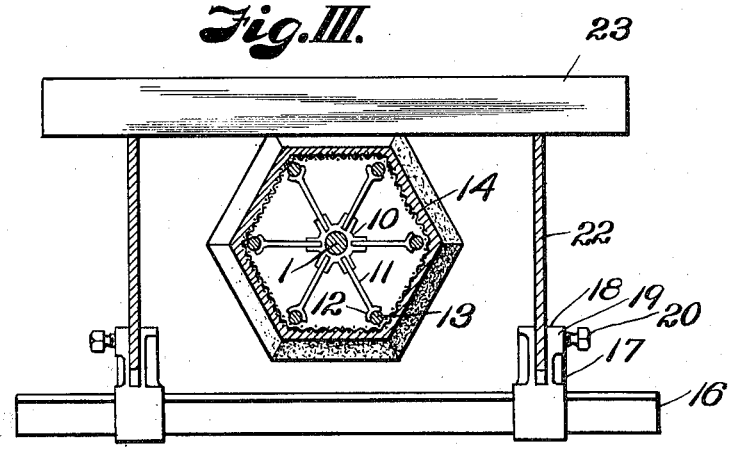
Fig. III.
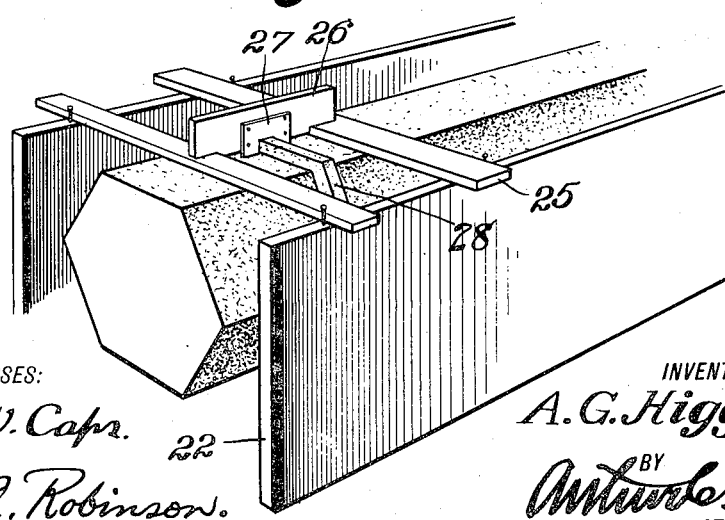
Fig. IV.
WITNESSES:
Arthur W. Capp.
Lynn A. Robinson.
INVENTOR
A. G. Higgins.
BY
ATTORNEY

UNITED STATES PATENT OFFICE.

ALBERT G. HIGGINS, OF KANSAS CITY, MISSOURI, ASSIGNOR TO THE TRUSSWALL MANUFACTURING COMPANY, OF KANSAS CITY, MISSOURI, A CORPORATION OF MISSOURI.

APPARATUS FOR CONSTRUCTING PLASTIC COLUMNS.

1,156,077.     Specification of Letters Patent.     Patented Oct. 12, 1915.

Application filed February 16, 1914. Serial No. 818,848.

*To all whom it may concern:*

Be it known that I, ALBERT G. HIGGINS, a citizen of the United States, residing at Kansas City, in the county of Jackson and State of Missouri, have invented certain new and useful Improvements in Apparatus for Constructing Plastic Columns; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to the construction of plastic concrete, and more particularly of built-up columns that are formed by applying plastic cement to the surface of a preformed core; the object of the present invention being to provide an apparatus for building up columns of this character uniformly and with economy of material and labor.

In carrying out my invention I provide structures for supporting the core and the column as the latter is being built, together with guides and forming devices; the preferred forms of which are illustrated in the accompanying drawings, wherein, Figure I is a perspective view of an apparatus for supporting a column during the building-up process, and illustrating a partially built-up column, a trowel for applying plastic material to the core, and guides for the trowel. Fig. II is a side elevation of a partially built-up column and one of the guides; the guide supports and trowel being shown in vertical section. Fig. III is a vertical section of the column and the apparatus on the line III—III, Fig. II. Fig. IV is a perspective view of the guides and a built-up column, showing the method of building up a bead, or the like, on the column.

Referring more in detail to the drawings, 1 designates a shaft which is carried in spindles 2 of lathe standards 3, so that the shaft may be revolved, one of the spindles being provided with a gage disk 5, having apertures 6 therein adapted for receiving a pin 7 on a bracket 8 that is fixed to one of the standards, to hold the shaft securely in a desired position.

Located at intervals throughout the length of the shaft 1 are spiders 10, the arms 11 of which have saddles 12 at their outer ends, within which are located the longitudinal core supporting rods 13, over which a sheet of wire mesh, or the like, 14 may be laid to form a foundation or core for the plastic column. It is apparent that the spacing or combination of the spider arms may determine the shape of the core, or a preformed shape may be applied thereto, if desired.

The wire mesh core is preferably wound with wire 15 to hold the core together and provide reinforcement for the column, or for the plastic material which is applied to the core to form the column.

Supported on each of the standards 3 are cross bars 16, and slidably mounted on the ends of the cross-bars are brackets 17, having upstanding yokes 18; the outer members of which are provided, at their upper ends, with heads 19 that carry set screws 20, and slidably mounted in the yokes 18, on the same side of the supporting frame, are guides 22, the upper edges of which serve to guide a trowel 23 that builds up and forms a column in the following manner: When it is desired to construct a hexagonal column, the supporting members are combined as described and the spiders arranged on the carrying shaft, so that the rods 13 are located at the corners of the hexagon; the arms at one end of the frame being longer than those at the other when a tapered column is to be made. With the supporting members so arranged, the wire mesh foundation or core is applied to the spider rods and the reinforcing wire wound thereabout. The guides 22 are then arranged so that their upper edges lie in a parallel plane slightly above that of the surface of the core; the guides being raised at one end if necessary to follow the plane of the tapered core. Cement, in workable condition, is then applied to the core by means of an ordinary trowel, or any other suitable manner, and the trowel 23 moved over the edges of the guides to level the cement which has been thrown onto the core, new material being supplied as the trowel is moved forwardly, in sufficient quantities to bring the surface of the column up to the level of the guides. When one side of the column has been formed in this manner, the core is turned and locked in position for working a succeeding side, and the operation just described repeated for that side of the column, and again for remaining sides until the core has been entirely surfaced.

After the first coat has been put on, the guides may be raised and another coat applied in the same manner; reinforcing being placed over the first coat if desired or the second coat may be applied directly onto the first. If transverse beads, or the like, are to be used on the column, cross guides 25 are applied to the upper edges of the guides 22, and a tool 26, having a die 27, fixed thereon, is moved transversely along the guides 25 and over the column to build up material applied to the surface of the column into the bead 28.

The method heretofore described is one for building up columns, or the like, of plastic material and shaping the column during the building-up process, so that there is practically no loss of material on account of the shaping, as distinguished from the cutting down method wherein the column is first formed in the rough and material afterward removed to provide the desired configurations.

Having thus described my invention, what I claim as new therein, and desire to secure by Letters-Patent, is:—

1. In an apparatus for constructing plastic columns, the combination of spaced supports, rotatable means carried by the supports for holding a column member, cross members carried by the supports, means on the cross members for holding guides in adjusted position and guides carried by said means and adapted for vertical adjustment.

2. In an apparatus for constructing plastic columns, the combination of spaced supports, rotatable means carried by the supports for holding a column member, cross members carried by the supports, upstanding brackets on the cross members, means on the brackets for holding guides in adjusted positions, and guides mounted in the brackets and adapted for vertical adjustment, for the purpose set forth.

3. In an apparatus for constructing plastic columns, the combination with spaced supports, of rotatable means carried by the supports for holding a column member, cross bars on the supports, brackets on the ends of the cross bars comprising upwardly opening yokes, guide boards mounted in the brackets at opposite sides of the column position, and set screws in one member of each of the brackets for clamping the guide boards in adjusted position, whereby guiding edges of the boards may be set to variable elevation relative to a column held on the supports.

In testimony whereof I affix my signature in presence of two witnesses.

ALBERT G. HIGGINS.

Witnesses:
LYNN A. ROBINSON,
L. E. COATS.